(12) United States Patent
Bassi et al.

(10) Patent No.: US 11,066,501 B2
(45) Date of Patent: Jul. 20, 2021

(54) METHOD FOR MANUFACTURING AN AQUEOUS LATEX COMPRISING PARTICLES OF A FLUOROPOLYMER

(71) Applicant: SOLVAY SPECIALTY POLYMERS ITALY S.P.A., Bollate (IT)

(72) Inventors: Mattia Bassi, Milan (IT); Alessio Marrani, Lecco (IT); Valeriy Kapelyushko, Alessandria (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 0 days.

(21) Appl. No.: 16/604,878

(22) PCT Filed: Apr. 9, 2018

(86) PCT No.: PCT/EP2018/059001
§ 371 (c)(1),
(2) Date: Oct. 11, 2019

(87) PCT Pub. No.: WO2018/189092
PCT Pub. Date: Oct. 18, 2018

(65) Prior Publication Data
US 2020/0377633 A1 Dec. 3, 2020

(30) Foreign Application Priority Data

Apr. 11, 2017 (EP) .................. 17165867

(51) Int. Cl.
| | |
|---|---|
| *C08F 214/26* | (2006.01) |
| *C08F 2/30* | (2006.01) |
| *C09D 127/18* | (2006.01) |
| *F16L 11/04* | (2006.01) |
| *C08F 114/26* | (2006.01) |
| *C08L 27/18* | (2006.01) |

(52) U.S. Cl.
CPC .......... *C08F 214/262* (2013.01); *C08F 2/30* (2013.01); *C08F 114/26* (2013.01); *C08L 27/18* (2013.01); *C09D 127/18* (2013.01); *F16L 11/04* (2013.01); *C08F 2800/10* (2013.01); *C08L 2201/52* (2013.01); *C08L 2203/18* (2013.01)

(58) Field of Classification Search
None
See application file for complete search history.

(56) References Cited

U.S. PATENT DOCUMENTS

| | | |
|---|---|---|
| 4,990,283 A | 2/1991 | Visca et al. |
| 5,498,680 A | 3/1996 | Abusleme et al. |
| 6,103,843 A | 8/2000 | Abusleme et al. |
| 6,448,328 B1 * | 9/2002 | Kappler .............. C08F 214/188 524/520 |
| 8,997,797 B2 | 4/2015 | Kitahara et al. |
| 2011/0160415 A1 * | 6/2011 | Marchionni ............ C08F 14/18 526/204 |

FOREIGN PATENT DOCUMENTS

| | | | |
|---|---|---|---|
| GB | 836741 A * | 6/1960 | .............. C08F 14/26 |
| JP | 2017020013 A | 1/2017 | |
| JP | 2017057379 A | 3/2017 | |
| WO | 2010003929 A1 | 1/2010 | |
| WO | 2011073344 A1 | 6/2011 | |
| WO | 2016099913 A1 | 6/2016 | |

OTHER PUBLICATIONS

ASTM D3418-08—Standard Test Method for Transition Temperatures and Enthalpies of Fusion and Crystallization of Polymers by Differential Scanning Calorimetry, 2008, 7 pages.
Standard ISO 13321—Particle size analysis—Photon correlation spectroscopy—Jul. 1, 1996—p. 1-20.

* cited by examiner

*Primary Examiner* — Nicole M. Buie-Hatcher
(74) *Attorney, Agent, or Firm* — Osha Bergman Watanabe & Burton LLP

(57) ABSTRACT

The present invention pertains to a method for manufacturing a melt-processible fluoropolymer, to the melt-processible fluoropolymer obtainable by the process and to uses of the melt-processible fluoropolymer in various applications.

12 Claims, No Drawings under 35
METHOD FOR MANUFACTURING AN AQUEOUS LATEX COMPRISING PARTICLES OF A FLUOROPOLYMER This application is a U.S. national phase entry under 35 U.S.C. § 371 of International Application No. PCT/EP2018/059001, filed on Apr. 9, 2018, which claims priority to European Application No. 17165867.7, filed on Apr. 11, 2017. The entire contents of these applications are explicitly incorporated herein by this reference.

TECHNICAL FIELD

The present invention pertains to a process for manufacturing a melt-processible fluoropolymer, to the melt-processible fluoropolymer obtainable by said process and to uses of said melt-processible fluoropolymer in various applications.

BACKGROUND ART

Melt-processible fluoropolymers are known in the art which are endowed with both high mechanical resistance and high chemical resistance to be suitably used in various applications.

Among melt-processible fluoropolymers, a specific class of materials which has drawn increasing attention to address fields of use, whereas a combination of excellent mechanical strength and chemical resistance is required, is the class of terpolymers of tetrafluoroethylene (TFE), vinylidene fluoride (VDF) and a third comonomer.

In this domain, U.S. Pat. No. 8,997,797 (DAIKIN INDUSTRIES, LTD.) 7 Apr. 2015 discloses fluoropolymers having a high crystallinity and a high storage modulus at 170° C. which are suitable for the manufacture of riser pipes, said fluoropolymers consisting of copolymerized units derived from tetrafluoroethylene (TFE), vinylidene fluoride (VDF) and an ethylenically unsaturated monomer other than tetrafluoroethylene and vinylidene fluoride. Among these terpolymers, mention is specifically made of (j) terpolymers of TFE and VDF with 0.1 to 5.0% moles of recurring units derived from a (per)fluoroalkyl ethylene monomer (e.g. $CH_2$=CH—$C_4F_9$; $CH_2$=CH—$C_6F_{13}$) and (jj) terpolymers of TFE and VDF with 0.1 to 0.8% moles of recurring units derived from a (per)(fluoro)alkyl vinyl ether of formula $CF_2$=CF—$OR_f^1$, with $R_{f1}$ being a $C_{1-3}$ alkyl group of a $C_{1-3}$ fluoroalkyl group. All exemplified working embodiments pertain to polymers manufactured by suspension polymerization at temperature of about 35° C., in the presence of a blend of water/perfluorinated alkane solvent, under organic peroxide initiation. Such methodologies are not suitable for providing stable fluoropolymer dispersions/latexes: the results thereof consist of slurry of coarse irregular particles.

WO 2016/099913 (W.L. GORE) 23 Jun. 2016 is directed to certain shaped parts made from core/shell PTFE-like materials, which have at least three melting point, more specifically a first endotherm between 50° C. and 300° C., a second endotherm between 320° C. and 350° C., and a third endotherm between 350° C. and 400° C., this third endotherm being approximately 380° C. In a specific example (Ex. 1), the manufacture of a TFE/VDF copolymer by emulsion polymerization in the presence of a fluorinated surfactant is described. At the inception, VDF is introduced in the reactor, and then TFE is further added. Then, once initiated polymerization, TFE (alone) is fed; after having converted 12 kg of TFE, feeding of VDF is started again. The overall core/shell polymer obtained is described as a latex possessing a VDF content of 27.9% moles (19.9% wt) and a DSC showing multiple melting points, in particular, 177.73° C.; 341.83° C. and 369.19° C., the first being representative of a quasi homopolymer of VDF, and the last being representative of a quasi-homopolymer of TFE.

JP 2017/057379 (Daikin Industries) pertains to a manufacturing method for polymerizing tetrafluoroethylene and vinylidene fluoride in presence of a surfactant and an aqueous medium, wherein the surfactant may be selected from the group consisting of:

(A) a fluorine-containing allyl ether compound represented by the formula: $CX_2$=CFCF_2—O—(CF(CF_3)CF_2O)_n$—CF(CF_3)—Y, where each X is the same or different and represent F or H, n represents 0 or an integer of 1 to 10, Y represents —$SO_3M$ or —COOM and M represents H, NH or an alkali metal;

(B) a linear 1-alkanesulfonic acid having 7 to 20 carbon atoms, a linear 2-alkanesulfonic acid having 7 to 20 carbon atoms, a linear 1,2-alkanedisulfonic acid having 7 to 20 carbon atoms and salts thereof;

(C) at least one nonfluorinated surfactant selected from the group consisting of polyvinylphosphonic acid, polyacrylic acid, polyvinylsulfonic acid and salts thereof;

(D) a surfactant having 2-100 repeating units of formulae —$CH_2CH_2O$— or —$CH_2CH_2CH_2O$—;

(E) a combination of (i) at least one surfactant selected from the group consisting of a nonfluorinated surfactant and a fluorinated surfactant having a molecular weight of less than 400 and (ii) a functional fluoropolyether comprising a fluoropolyoxyalkylene chain and a functional group ether; and (F) Inactivated hydrocarbon-containing surfactant, at a pressure which may vary between 0 and 9.8 MPaG (98 bar). In connection with choice (E), the use of a cyclic fluorosurfactant is enumerated as a possible embodiment of a fluorinated surfactant of molecular weight of less than 400, which can be used in combination with a functional perfluoropolyether. Overall, nonetheless, in all the examples, the reactive allyl fluorosurfactant $CH_2$=CFCF_2—O—(CF(CF_3)CF_2O)—CF(CF_3)—COONH_4$ is used.

While various attempts have been made in the art to manufacture copolymers of TFE and VDF, possibly comprising other copolymers, there is a continuous need in the art for methods of manufacturing the same under the form of latexes comprising particles of given size, by an efficient and cost-effective process, with higher polymerization kinetics.

SUMMARY OF INVENTION

It has been now surprisingly found that the process of the invention advantageously enable easily providing polymers of TFE and VDF in an efficient manner.

In particular, it has been found that the process of the invention is advantageously carried out at relatively low pressure while achieving high polymerization rates combined with high solid contents in the aqueous latexes provided therefrom, and with controlled particle size.

It has been also found that the aqueous latex of the invention may be formulated, e.g. mixed and co-coagulated, with other aqueous latexes thereby providing homogeneous mixtures suitable for use in various applications, especially in coating applications.

In a first instance, the present invention pertains to a method for manufacturing an aqueous latex comprising particles of a fluoropolymer [polymer (F)] essentially consisting of:

from 60% to 85% by moles, preferably from 65% to 80% by moles of recurring units derived from tetrafluoroethylene (TFE), from 15% to 40% by moles, preferably from 20% to 35% by moles of recurring units derived from vinylidene fluoride (VDF), and optionally, from 0 to 10% by moles of recurring units derived from at least one fluorinated monomer different from tetrafluoroethylene (TFE) and vinylidene fluoride (VDF), wherein the molar amounts of said recurring units are relative to the total moles of recurring units in said polymer (F), said polymer (F) possessing melting point ($T_m$) comprised between 170° C. and 300° C., whereas melting point is determined by differential scanning calorimetry (DSC) according to ASTM D 3418 standard method, said method comprising polymerizing TFE, VDF and optionally said fluorinated monomer by emulsion polymerization in an aqueous polymerization medium comprising at least one surfactant [surfactant (F)] of formula (II):

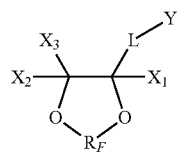

(II)

wherein $X_1$, $X_2$ and $X_3$, equal to or different from each other, are independently selected from the group consisting of H, F and $C_1$-$C_6$ (per)fluoroalkyl groups, optionally comprising one or more catenary or non-catenary oxygen atoms, L is a bond or a divalent group, $R_F$ is a divalent fluorinated $C_1$-$C_3$ bridging group, and Y is an anionic functionality, and said method comprising feeding a gaseous blend of TFE and VDF for maintaining polymerization pressure comprised between 6 bar and 20 bar.

In a second instance, the present invention pertains to an aqueous latex comprising:

(A) at least one polymer (F) comprising:
from 60% to 85% by moles, preferably from 65% to 80% by moles of recurring units derived from tetrafluoroethylene (TFE), and from 15% to 40% by moles, preferably from 20% to 35% by moles of recurring units derived from vinylidene fluoride (VDF), optionally, from 0 to 10% by moles, preferably from 0% to 5% by moles of recurring units derived from at least one fluorinated monomer different from tetrafluoroethylene (TFE) and vinylidene fluoride (VDF), wherein the molar amounts of said recurring units are relative to the total moles of recurring units in said polymer (F), and (B) at least one surfactant [surfactant (F)], as above detailed wherein the polymer (F) in the aqueous latex is in the form of primary particles having an average primary particle size of from 55 to 300 nm, as measured according to ISO 13321.

The polymer (F) of the invention is advantageously melt-processable. The term "melt-processable" is hereby intended to denote a fluoropolymer which can be processed by conventional melt-processing techniques.

The polymer (F) of the invention has melting point ($T_m$) comprised between 170° C. and 300° C., preferably between 200° C. and 280° C., whereas melting point is determined by differential scanning calorimetry (DSC) according to ASTM D 3418 standard method.

For the purpose of the present invention, the term "fluorinated monomer" is intended to denote an ethylenically unsaturated monomer comprising at least one fluorine atom.

Should the fluorinated monomer comprise at least one hydrogen atom, it is designated as hydrogen-containing fluorinated monomer.

Should the fluorinated monomer be free of hydrogen atoms, it is designated as per(halo)fluorinated monomer.

The fluorinated monomer may further comprise one or more other halogen atoms (Cl, Br, I).

Non-limiting examples of suitable fluorinated monomers include, notably, the followings:

$C_3$-$C_8$ perfluoroolefins such as hexafluoropropylene (HFP);

$C_2$-$C_8$ hydrogenated fluoroolefins such as vinyl fluoride, 1,2-difluoroethylene and trifluoroethylene;

perfluoroalkylethylenes of formula $CH_2{=}CH{-}R_{f0}$, wherein $R_{f0}$ is a $C_1$-$C_6$ perfluoroalkyl group;

chloro- and/or bromo- and/or iodo-$C_2$-$C_6$ fluoroolefins such as chlorotrifluoroethylene;

(per)fluoroalkylvinylethers of formula $CF_2{=}CFOR_{f1}$, wherein $R_{f1}$ is a $C_1$-$C_6$ fluoro- or perfluoroalkyl group, e.g. $CF_3$, $C_2F_5$, $C_3F_7$;

$CF_2{=}CFOX_0$ (per)fluoro-oxyalkylvinylethers, wherein $X_0$ is a $C_1$-$C_{12}$ alkyl group, a $C_1$-$C_{12}$ oxyalkyl group or a $C_1$-$C_{12}$ (per)fluorooxyalkyl group having one or more ether groups, such as perfluoro-2-propoxy-propyl group;

(per)fluoroalkylvinylethers of formula $CF_2{=}CFOCF_2OR_{f2}$, wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group having one or more ether groups such as $-C_2F_5-O-CF_3$;

functional (per)fluoro-oxyalkylvinylethers of formula $CF_2{=}CFOY_0$, wherein $Y_0$ is a $C_1$-$C_{12}$ alkyl group or (per)fluoroalkyl group, a $C_1$-$C_{12}$ oxyalkyl group or a $C_1$-$C_{12}$ (per)fluorooxyalkyl group having one or more ether groups and $Y_0$ comprising a carboxylic or sulfonic acid group, in its acid, acid halide or salt form; and fluorodioxoles, preferably perfluorodioxoles.

The polymer (F) of the invention typically further comprises recurring units derived from at least one perfluoroalkylvinylether (PAVE) of formula (I):

(I)

wherein $R_f$ is a $C_1$-$C_6$ alkyl group or a $C_1$-$C_6$ (per)fluoroalkyl group.

The polymer (F) of the invention preferably comprises from 0.1% to 5% by moles, preferably from 1% to 5% by moles, more preferably from 1.5% to 3.5% by moles of recurring units derived from at least one perfluoroalkylvinylether (PAVE) of formula (I):

(I)

wherein $R_f$ is a $C_1$-$C_6$ alkyl group or a $C_1$-$C_6$ (per)fluoroalkyl group, wherein the molar amounts of said recurring units are relative to the total moles of recurring units in said polymer (F).

The polymer (F) of the invention preferably consists essentially of:

from 60% to 80% by moles, preferably from 65% to 78% by moles of recurring units derived from tetrafluoroethylene (TFE), from 15% to 35% by moles, preferably from 20% to 30% by moles of recurring units derived from vinylidene fluoride (VDF), and from 0.1% to 5% by moles, preferably from 1% to 5% by moles, more preferably from 1.5% to 3.5% by moles of recurring units derived from at least one perfluoroalkylvinylether (PAVE) of formula (I):

(I)

wherein $R_f$ is a $C_1$-$C_6$ alkyl group or a $C_1$-$C_6$ (per)fluoroalkyl group, wherein the molar amounts of said recurring units are relative to the total moles of recurring units in said polymer (F).

The perfluoroalkylvinylether (PAVE) of formula (I) is typically selected from the group consisting of perfluoromethylvinylether (PMVE) of formula $CF_2=CF-O-CF_3$, perfluoroethylvinylether (PEVE) of formula $CF_2=CF-O-CF_2-CF_3$ and perfluoropropylvinylether (PPVE) of formula $CF_2=CF-O-CF_2-CF_2-CF_3$, more preferably is selected from PMVE and PPVE.

As said, the surfactant (F) is a cyclic fluorocompound of formula (II):

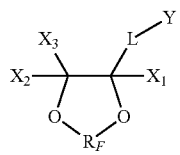
(II)

wherein $X_1$, $X_2$ and $X_3$, equal to or different from each other, are independently selected from the group consisting of H, F and $C_1$-$C_6$ (per)fluoroalkyl groups, optionally comprising one or more catenary or non-catenary oxygen atoms, L is a bond or a divalent group, $R_F$ is a divalent fluorinated $C_1$-$C_3$ bridging group, and Y is an anionic functionality.

In formula (II), the anionic functionality Y is preferably selected from the group consisting of those of formulae:

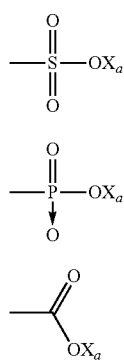

(1")

(2")

(3")

wherein $X_a$ is H, a monovalent metal (preferably an alkaline metal) or an ammonium group of formula $-N(R'_n)_4$, wherein $R'_n$, equal or different at each occurrence, is a hydrogen atom or a $C_1$-$C_6$ hydrocarbon group (preferably an alkyl group).

Most preferably, the anionic functionality Y is a carboxylate of formula (3") as defined above.

According to a first variant, the surfactant (F) is a cyclic fluorocompound of formula (III):

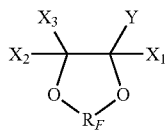
(III)

wherein $X_1$, $X_2$, $X_3$, $R_F$ and Y have the same meaning as defined above.

More preferably, the cyclic fluorocompound of this first variant of this first embodiment of the invention is of formula (IV):

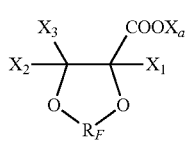
(IV)

wherein $X_1$, $X_2$, $X_3$, $R_F$ and $X_a$ have the same meaning as defined above.

According to a second variant, the surfactant (F) is a cyclic fluorocompound of formula (V):

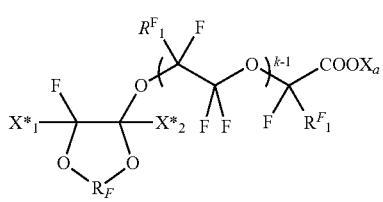
(V)

wherein $R^F$ and $X_a$ have the same meanings as defined above, $X^*1$, $X^*_2$, equal to or different from each other, are independently a fluorine atom, $-R'_f$ or $-OR'_f$, wherein $R'_f$ is a $C_1$-$C_3$ perfluoroalkyl group, $R^F_1$ is F or $CF_3$, and k is an integer from 1 to 3.

More preferably, the surfactant (F) of this first embodiment of the invention is a cyclic fluorocompound of formula (VI):

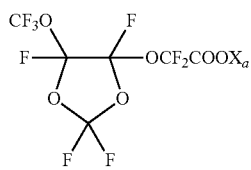
(VI)

wherein $X_a$ has the same meaning as defined above and, in particular, with $X_a$ being $NH_4$.

The method of the invention results in an aqueous latex comprising particles of polymer (F). The expression "aqueous latex" is hereby used according to its usual meaning, i.e. intended to denote an aqueous medium comprising homogeneously dispersed therein primary particles of polymer (F).

The aqueous latex comprising particles of polymer (F), resulting from the method of the invention, comprises said polymer (F) under the form of primary particles having an average primary particle size of 55 nm to 300 nm, as measured according to ISO 13321. In general, average primary particle size of polymer (F) in the said aqueous latex is comprised between 55 nm and 300 nm, preferably between 120 nm and 280 nm, most preferably between 150 and 250 nm, as measured according to ISO 13321.

For the purpose of the present invention, by "average primary particle size" it is intended to denote the average size of primary particles of polymer (F) obtainable by aqueous emulsion polymerization.

For the purpose of the present invention, "primary particles" of polymer (F) are to be intended distinguishable from agglomerates of primary particles, which maybe e.g. obtained through coagulation of latex. Aqueous latexes comprising primary particles of polymer (F) are advantageously obtainable by aqueous emulsion polymerization. Agglomerates of primary particles of polymer (F) are typically obtainable by recovery and conditioning steps of polymer (F) manufacture such as concentration and/or coagulation of aqueous polymer (F) latexes and subsequent drying and homogenization thereby providing polymer (F) powders.

The aqueous latex obtainable by the method of the invention is thus to be intended distinguishable from an aqueous slurry prepared by dispersing polymer (F) powders in an aqueous medium. The average particle size of polymer (F) powders dispersed in an aqueous slurry is typically higher than 1.0 µm, as measured according to ISO 13321.

The aqueous latex obtainable by the method of the invention advantageously has homogeneously dispersed therein primary particles of at least one polymer (F) having an average primary particle size comprised between 55 nm and 300 nm, preferably between 120 nm and 280 nm, as measured according to ISO 13321.

The method of the invention comprises feeding a gaseous blend of TFE and VDF for maintaining polymerization pressure comprised between 6 bar and 20 bar, preferably between 10 bar and 18 bar, preferably between 11 bar and 16 bar.

The skilled in the art will choose the polymerization temperature having regards, inter alia, of the radical initiator used. This being said, it is generally recognized that polymerization temperatures exceeding 50° C. are generally required for achieving optimum efficiency. Hence, the method of the invention generally comprises polymerizing at a temperature comprised between 50° C. and 135° C., preferably between 55° C. and 130° C.

While the choice of the radical initiator is not particularly limited, it is understood that water-soluble radical initiators suitable for aqueous emulsion polymerization would be preferred.

Among water-soluble radical initiators capable of initiating and/or accelerating the polymerization process in the method of the invention, preference will be given to inorganic radical initiators which include, but are not limited to, persulfates such as sodium, potassium and ammonium persulfates, permanganates such as potassium permanganate.

Also, organic radical initiators may be used and include, but are not limited to, the followings: acetylcyclohexanesulfonyl peroxide; diacetylperoxydicarbonate; dialkylperoxydicarbonates such as diethylperoxydicarbonate, dicyclohexylperoxydicarbonate, di-2-ethylhexylperoxydicarbonate; tert-butylperneodecanoate; 2,2'-azobis(4-methoxy-2,4-dimethylvaleronitrile; tert-butylperpivalate; dioctanoylperoxide; dilauroyl-peroxide; 2,2'-azobis (2,4-dimethylvaleronitrile); tert-butylazo-2-cyanobutane; dibenzoylperoxide; tert-butylper-2ethylhexanoate; tert-butylpermaleate; 2,2'-azobis (isobutyronitrile); bis(tert-butylperoxy)cyclohexane; tert-butyl-peroxyisopropylcarbonate; tert-butylperacetate; 2,2'-bis (tert-butylperoxy)butane; dicumyl peroxide; di-tert-amyl peroxide; di-tert-butyl peroxide (DTBP); p-methane hydroperoxide; pinane hydroperoxide; cumene hydroperoxide; and tert-butyl hydroperoxide.

Other suitable radical initiators notably include halogenated free radical initiators such as chlorocarbon based and fluorocarbon based acyl peroxides such as trichloroacetyl peroxide, bis(perfluoro-2-propoxy propionyl) peroxide, $[CF_3CF_2CF_2OCF(CF_3)COO]_2$, perfluoropropionyl peroxides, $(CF_3CF_2CF_2COO)_2$, $(CF_3CF_2COO)_2$, $\{(CF_3CF_2CF_2)-[CF(CF_3)CF_2O]_m-CF(CF_3)-COO\}_2$ where m=0-8, $[ClCF_2(CF_2)_nCOO]_2$, and $[HCF_2(CF_2)_nCOO]_2$ where n=0-8; perfluoroalkyl azo compounds such as perfluoroazoisopropane, $[(CF_3)_2CFN=]_2$, $R^nN=NR^n$, where $R^n$ is a linear or branched perfluorocarbon group having 1-8 carbons; stable or hindered perfluoroalkane radicals such as hexafluoropropylene trimer radical, $[(CF_3)_2CF]_2(CF_2CF_2)C^·$ radical and perfluoroalkanes.

Redox systems, comprising at least two components forming a redox couple, such as dimethylaniline-benzoyl peroxide, diethylaniline-benzoyl peroxide and diphenylamine-benzoyl peroxide may also be used as radical initiators to initiate the polymerization process.

Among inorganic radical initiators, ammonium persulfate is particularly preferred.

Among organic radical initiators, the peroxides having a self-accelerating decomposition temperature (SADT) higher than 50° C. are particularly preferred, such as for instance: di-tert-butyl peroxide (DTBP), diterbutylperoxyisopropylcarbonate, terbutyl(2-ethyl-hexyl)peroxycarbonate, terbutylperoxy-3,5,5-trimethylhexanoate.

One or more radical initiators as defined above may be added to the aqueous polymerization medium of the process of the invention in an amount ranging advantageously from 0.001% to 20% by weight based on the weight of the aqueous polymerization medium.

According to certain embodiments, in the method of the invention, the aqueous polymerization medium may further comprise at least one non-functional perfluoropolyether (PFPE) oil.

By "non-functional perfluoropolyether (PFPE) oil" it is hereby intended to denote a perfluoropolyether (PFPE) oil comprising a (per)fluoropolyoxyalkylene chain [chain $(R_f)$] and non-functional end-groups.

The non-functional end groups of the non-functional PFPE oil are generally selected from fluoro(halo)alkyl groups having 1 to 3 carbon atoms, optionally comprising one or more halogen atoms different from fluorine or hydrogen atoms, e.g. $CF_3—$, $C_2F_5—$, $C_3F_6—$, $ClCF_2CF(CF_3)—$, $CF_3CFClCF_2—$, $ClCF_2CF_2—$, $ClCF_2—$.

The non-functional PFPE oil has a number average molecular weight advantageously comprised between 400 and 3000, preferably between 600 and 1500.

The non-functional PFPE oil is more preferably selected from the group consisting of:
(1') non-functional PFPE oils commercially available from Solvay Solexis S.p.A. under the trademark names GALDEN® and FOMBLIN®, said PFPE oils generally comprising at least one PFPE oil complying with either of formulae here below:

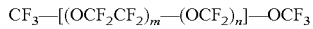

m+n=40–180;m/n=0.5–2

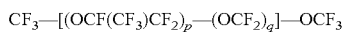

p+q=8–45;p/q=20–1000

(2') non-functional PFPE oils commercially available from Daikin under the trademark name DEMNUM®, said PFPEs generally comprising at least one PFPE complying with formula here below:

$$F—(CF_2CF_2CF_2O)_n—(CF_2CF_2CH_2O)_j—CF_2CF_3$$

$j=0$ or integer$>0$; $n+j=10$–$150$ (3') non-functional PFPE oils commercially available from Du Pont de Nemours under the trademark name KRY-TOX©, said PFPEs generally comprising at least one low-molecular weight, fluorine end-capped, homopolymer of hexafluoropropylene epoxide complying with formula here below:

$$F—(CF(CF_3)CF_2O)_n—CF_2CF_3$$

$n=10$–$60$

The non-functional PFPE oil is even more preferably selected from those having formula (1') as described above.

The process of the invention is typically carried out in the presence of a chain transfer agent.

The chain transfer agent is generally selected from those known in the polymerization of fluorinated monomers such as ethane, ketones, esters, ethers or aliphatic alcohols having from 3 to 10 carbon atoms like, e.g., acetone, ethylacetate, diethylether, methyl-ter-butyl ether, isopropyl alcohol; chloro(fluoro)carbons, optionally containing hydrogen, having from 1 to 6 carbon atoms, like, e.g., chloroform, trichlorofluoromethane; bis(alkyl)carbonates wherein the alkyl has from 1 to 5 carbon atoms like, e.g., bis(ethyl)carbonate, bis(isobutyl)carbonate. The chain transfer agent may be fed to the aqueous medium at the beginning, continuously or in discrete amounts (step-wise) during the polymerization, continuous or stepwise feeding being preferred.

Aqueous emulsion polymerization processes as detailed above have been described in the art (see e.g. U.S. Pat. No. 4,990,283 (AUSIMONT S.P.A.) 5 Feb. 1991, U.S. Pat. No. 5,498,680 (AUSIMONT S.P.A.) 12 Mar. 1996 and U.S. Pat. No. 6,103,843 (AUSIMONT S.P.A.) 15 Aug. 2000).

The aqueous latex of the invention preferably comprises from 20% to 30% by weight of at least one polymer (F).

The aqueous latex of the invention may be up-concentrated according to any techniques known in the art.

Generally, the aqueous latex of the invention is further formulated through addition of at least one non-ionic hydrogenated surfactant [surfactant (NS)].

Non-limiting examples of suitable surfactants (NS) include, notably, long-chain-substituted phenol alkoxylates (e.g. octyl phenol ethoxylates) and aliphatic fatty alcohol alkoxylates, in particular long chain ($C_{11}$-$C_{13}$) aliphatic alcohol, alkoxylated to comprise recurring units derived from ethylene oxide and/or propylene oxide, in an amount of generally 6 to 15 units, preferably 6 to 10 units.

The surfactant (NS) has generally a cloud point of advantageously 50° C. or more, preferably of 55° C. or more, as measured according to EN 1890 standard (method A: 1% by weight water solution).

The surfactant (NS) is preferably selected from the group consisting of non-ionic hydrogenated surfactants commercially available under the trademark names TRIXON® X and PLURONIC®.

In a fourth instance, the present invention pertains to use of the polymer (F) of the invention in various applications.

The polymer (F) of the invention is particularly suitable for use in oil and gas applications and automotive applications.

In a fifth instance, the present invention pertains to use of the aqueous latex of the invention in various applications.

The aqueous latex of the invention is particularly suitable for use in coating applications.

The invention will be now described in more detail with reference to the following examples whose purpose is merely illustrative and not limitative of the scope of the invention.

General Procedure for the Manufacture of Polymer (F-1)

In an AISI 316 steel vertical autoclave, equipped with baffles and a stirrer working at 180 rpm, 64 litres of demineralized water were introduced. The temperature was then brought to reaction temperature of 80° C. and, when this temperature was reached, 600 grams of a 34% w/w aqueous solution of cyclic surfactant of formula (VI) as defined above, with $X_a$=$NH_4$, and 2 bar of vinylidene fluoride were introduced.

A gaseous mixture of TFE-VDF in the molar nominal ratio of 60:40 was subsequently added via a compressor until reaching a pressure of 12 bar. Then, 500 ml of a 3% by weight water solution of sodium persulfate (NaPS) as initiator was fed. The polymerization pressure was maintained constant by feeding the above mentioned TFE-VDF mixture. When 10000 g of the mixture were fed, the reactor was cooled at room temperature, the latex was discharged. The latex was then frozen for 48 hours and, once unfrozen, the coagulated polymer was washed with demineralized water and dried at 80° C. for 48 hours.

General Procedure for the Manufacture of Polymer (F-2)

In an AISI 316 steel vertical autoclave, equipped with baffles and a stirrer working at 180 rpm, 64 liter of demineralized water were introduced. The temperature was then brought to reaction temperature of 80° C. and, when this temperature was reached, 600 grams of a 34% w/w aqueous solution of cyclic surfactant of formula (VI) as defined above, with $X_a$=$NH_4$, and 2 bar of vinylidene fluoride were introduced. 0.1 bar of ethane and 0.15 bar of PMVE were subsequently added.

A gaseous mixture of TFE-VDF-PMVE in the molar nominal ratio of 69:30:1 was subsequently added via a compressor until reaching a pressure of 12 bar.

Then, 600 ml of a 3% by weight water solution of sodium persulfate (NaPS) as initiator was fed. The polymerization pressure was maintained constant by feeding the above mentioned TFE-VDF-PMVE mixture. When 10000 g of the mixture were fed, the reactor was cooled at room temperature, the latex was discharged. The latex was then frozen for 48 hours and, once unfrozen, the coagulated polymer was washed with demineralized water and dried at 80° C. for 48 hours.

General Procedure for the Manufacture of Polymer (F-3)

In an AISI 316 steel vertical autoclave, equipped with baffles and a stirrer working at 570 rpm, 3.5 liter of demineralized water were introduced. The temperature was then brought to reaction temperature of 80° C. and the selected amount of 34% w/w aqueous solution of cyclic surfactant of formula (VI) as defined above, with $X_a$=$NH_4$, and 2 bar of VDF were introduced.

A gaseous mixture of TFE-VDF in the molar nominal ratio of 60:40 was subsequently added via a compressor until reaching a pressure of 12 bar. Then, 500 ml of a 3% by weight water solution of sodium persulfate (NaPS) as initiator was fed. The polymerization pressure was maintained constant by feeding the above mentioned TFE-VDF mixture. When 1000 g of the mixture were fed, the reactor was cooled at room temperature, the latex was discharged.

The average primary particle size of the polymer (F-3) in the aqueous latex was 267 nm, as measured according to ISO 13321.

The latex was then frozen for 48 hours and, once unfrozen, the coagulated polymer was washed with demineralized water and dried at 160° C. for 24 hours.

General Procedure for the Manufacture of Polymers (F-4), (F-5), (F-6) and (F-7)

In an AISI 316 steel vertical autoclave, equipped with baffles and a stirrer working at 570 rpm, 3.5 liter of demineralized water were introduced. The temperature was then brought to reaction temperature of 80° C. and the selected amount of 34% w/w aqueous solution of cyclic surfactant of formula (VI) as defined above, with $X_a$=$NH_4$, was added. VDF, PMVE and ethane were introduced to the selected pressure variation reported in Table 1.

A gaseous mixture of TFE-VDF-PMVE in the following molar nominal ratio was subsequently added via a compressor until reaching a pressure of 12 bar:

polymer (F-4): TFE (69.0% mol)–VDF (29.4% mol)–PMVE (1.6% mol), polymer (F-5): TFE (68.6% mol)–VDF (29.0% mol)–PMVE (2.4% mol), polymer (F-6): TFE (77.0% mol)–VDF (20.0% mol)–PMVE (3.0% mol), polymer (F-7): TFE (69.0% mol)–VDF (30.0% mol)–PMVE (1.0% mol).

Then, the selected amount of a 3% by weight water solution of sodium persulfate (NaPS) as initiator was fed. The polymerization pressure was maintained constant by feeding the above mentioned TFE-VDF-PMVE mixture. When 1000 g of the mixture were fed, the reactor was cooled at room temperature, the latex was discharged, frozen for 48 hours and, once unfrozen, the coagulated polymer was washed with demineralized water and dried at 160° C. for 24 hours.

The process conditions are set forth in Table 1.

TABLE 1

|  | (F-4) | (F-5) | (F-6) | (F-7) |
|---|---|---|---|---|
| Surfactant solution [g] | 25 | 30 | 50 | 50 |
| Surfactant concentration [g/l] | 2.43 | 2.91 | 4.86 | 4.86 |
| Initiator solution [ml] | 30 | 35 | 70 | 60 |
| Initiator amount[1] [g/kg] | 0.9 | 1.05 | 2.1 | 1.8 |
| VDF[2] [bar] | 1.8 | 1.8 | 1.2 | 1.8 |
| PMVE [bar] | 0.3 | 0.45 | 0.6 | 0.2 |
| Ethane [bar] | 0.05 | 0.05 | 0.05 | 0.05 |

[1]Based on monomers converted/polymer produced;
[2]initial partial pressure of VDF.

Measurement of the Second Melting Temperature

The melting point was determined by differential scanning calorimetry (DSC) according to ASTM D 3418 standard method. The second melting temperature, defined as the endothermic peak observed during the second heating period, was recorded and is hereby referred to as the melting point ($T_m$) of the polymer.

The results regarding polymers (F-1), (F-2), (F-3), (F-4), (F-5), (F-6) and (F-7) of the invention are set forth in Table 2 here below:

TABLE 2

|  | (F-1) | (F-2) | (F-3) | (F-4) | (F-5) | (F-6) | (F-7) |
|---|---|---|---|---|---|---|---|
| particle size [nm] | 209 | 201 | 205 | 186 | 196 | 206 | 204 |
| $T_m$ [° C.] | 225 | 239 | 224 | 230 | 219 | 246 | 237 |

General Procedure for the Manufacture of Polymer (F-8)

In an AISI 316 steel vertical autoclave, equipped with baffles and a stirrer working at 570 rpm, 3.5 liter of demineralized water were introduced. The temperature was then brought to reaction temperature of 80° C. and the selected amount of 34% w/w aqueous solution of cyclic surfactant of formula (VI) as defined above, with $X_a$=$NH_4$, was added. VDF and ethane were introduced to the selected pressure variation reported in Table 1.

A gaseous mixture of TFE-VDF in the molar nominal ratio reported in Table 3 was subsequently added via a compressor until reaching a pressure of 20 bar. Then, the selected amount of a 3% by weight water solution of sodium persulfate (NaPS) as initiator was fed. The polymerization pressure was maintained constant by feeding the above mentioned TFE-VDF while adding the PPVE monomer at regular intervals until reaching the total amount indicated in the table 3.

When 1000 g of the mixture were fed, the reactor was cooled at room temperature, the latex was discharged, frozen for 48 hours and, once unfrozen, the coagulated polymer was washed with demineralized water and dried at 160° C. for 24 hours.

The composition of the obtained polymer (F-8), as measured by NMR, was Polymer (F-8)(693/99): TFE (69.6% mol)–VDF (27.3% mol)–PPVE (2.1% mol), having melting point $T_m$=218° C. and MFI=5 g/10'.

The procedure leading to polymer (F-8) was repeated for manufacturing (F-9), by introducing the amount of ingredients indicated in the second column of Table 3. The composition of the obtained polymer (F-8), as measured by NMR, was Polymer (F-8)(693/100): TFE (68% mol)–VDF (29.8% mol)–PPVE (2.2% mol), having melting point $T_m$=219° C. and MFI=1.5 g/10'.

The procedure leading to polymer (F-8) was repeated for manufacturing polymer (F-10), by introducing the amount of ingredients indicated in the third column of Table 3. The composition of the obtained polymer (F-10), as measured by NMR, was Polymer (F-10)(693/67): TFE (71% mol)–VDF (28.5% mol)–PPVE (0.5% mol), having melting point $T_m$=249° C. and MFI=5 g/10'.

TABLE 3

|  | (F-8) | (F-9) | (F-10) |
|---|---|---|---|
| Surfactant solution [g] | 50 | 50 | 50 |
| Surfactant [g/l] | 4.85 | 4.85 | 4.85 |
| Initiator solution [ml] | 100 | 100 | 100 |
| Initiator [g/kg] | 3 | 3 | 3 |
| VDF [bar] | 1.8 | 1.8 | 0 |
| TFE/VDF mixture [molar ratio] | 70/30 | 70/30 | 70/30 |
| FPVE [g] | 122 | 122 | 31 |
| Ethane [bar] | 0.6 | 0.3 | 0.25 |

TABLE 2

|  | (F-8) | (F-9) | (F-10) |
|---|---|---|---|
| particle size [nm] | 186 | 204 | 196 |
| $T_m$ [° C.] | 218 | 219 | 249 |

The invention claimed is:

1. A method for manufacturing an aqueous latex comprising particles of polymer (F), wherein polymer (F) is a fluoropolymer essentially consisting of:
   from 60% to 85% by moles of recurring units derived from tetrafluoroethylene (TFE),
   from 15% to 40% by moles of recurring units derived from vinylidene fluoride (VDF),
   from 1.0% to 5% by moles of recurring units derived from at least one perfluoroalkylvinylether (PAVE) of formula (I):

   $$CF_2=CF-O-R_f \quad (I)$$

wherein $R_f$ is a $C_1$-$C_6$ alkyl group or a $C_1$-$C_6$ (per)fluoroalkyl group, and
   optionally, from 0 to 10% by moles of recurring units derived from at least one fluorinated monomer different from tetrafluoroethylene (TFE), vinylidene fluoride (VDF), and perfluoroalkylvinylether (PAVE) of formula (I),
   wherein the molar amounts of said recurring units are relative to the total moles of recurring units in said polymer (F),
   said polymer (F) possessing melting point ($T_m$) comprised between 170° C. and 300° C., where the melting point is determined by differential scanning calorimetry (DSC) according to ASTM D 3418 standard method,
   said method comprising polymerizing TFE, VDF and optionally said fluorinated monomer by emulsion polymerization in an aqueous polymerization medium comprising at least one surfactant (F) of formula (II):

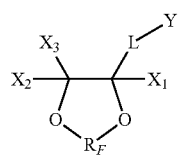

wherein $X_1$, $X_2$ and $X_3$, equal to or different from each other, are independently selected from the group consisting of H, F and $C_1$-$C_6$ (per)fluoroalkyl groups, optionally comprising one or more catenary or non-catenary oxygen atoms, L is a bond or a divalent group, $R_F$ is a divalent fluorinated $C_1$-$C_3$ bridging group, and Y is an anionic functionality, and said method comprising feeding a gaseous blend of TFE and VDF for maintaining polymerization pressure comprised between 6 bar and 20 bar.

2. The method according to claim 1, said method being carried out at a temperature comprised between 50° C. and 135° C. and/or wherein the method comprises feeding a gaseous blend of TFE and VDF for maintaining polymerization pressure comprised between 10 bar and 18 bar.

3. The method according to claim 1, wherein the surfactant (F) is a cyclic fluorocompound of formula (V):

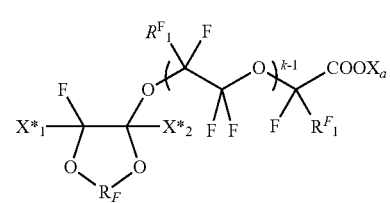

wherein $R_F$ is a divalent fluorinated $C_1$-$C_3$ bridging group,
   $X_a$ is H, a monovalent metal or an ammonium group of formula $-N(R'_n)_4$ wherein $R'_n$, equal or different at each occurrence, is a hydrogen atom or a $C_1$-$C_6$ hydrocarbon group,
   $X^*_1$ and $X^*_2$, equal to or different from each other, are independently a fluorine atom, $-R'_f$ or $-OR'_f$ wherein $R'_f$ is a $C_1$-$C_3$ perfluoroalkyl group,
   $R^F_1$ is F or $CF_3$, and
   k is an integer from 1 to 3.

4. The method according to claim 2, said method being carried out at a temperature comprised between 55° C. and 130° C., and/or wherein the method comprises feeding a gaseous blend of TFE and VDF for maintaining polymerization pressure comprised between 11 bar and 16 bar.

5. The method according to claim 1, wherein the polymer (F) further comprises recurring units derived from at least one fluorinated monomer different from tetrafluoroethylene (TFE), vinylidene fluoride (VDF), and perfluoroalkylvinylether (PAVE) of formula (I).

6. The method according to claim 1, wherein the polymer (F) comprises:
   from 60% to 80% by moles of recurring units derived from tetrafluoroethylene (TFE),
   from 15% to 35% by moles of recurring units derived from vinylidene fluoride (VDF), and
   from 1.0% to 5% by moles of recurring units derived from at least one perfluoroalkylvinylether (PAVE) of formula (I):

   $$CF_2=CF-O-R_f \quad (I)$$

wherein $R_f$ is a $C_1$-$C_6$ alkyl group or a $C_1$-$C_6$ (per)fluoroalkyl group,
   wherein the molar amounts of said recurring units are relative to the total moles of recurring units in said polymer (F).

7. The method according to claim 6, wherein polymer (F) comprises:
   from 65% to 78% by moles of recurring units derived from tetrafluoroethylene (TFE),
   from 20% to 30% by moles of recurring units derived from vinylidene fluoride (VDF), and
   from 1.5% to 3.5% by moles of recurring units derived from the at least one perfluoroalkylvinylether (PAVE) of formula (I),
   wherein the molar amounts of said recurring units are relative to the total moles of recurring units in said polymer (F).

8. The method according to claim 1, wherein the perfluoroalkylvinylether (PAVE) of formula (I) is selected from the group consisting of perfluoromethylvinylether (PMVE) of formula $CF_2=CF-O-CF_3$, perfluoroethylvinylether (PEVE) of formula $CF_2=CF-O-CF_2-CF_3$ and perfluoropropylvinylether (PPVE) of formula $CF_2=CF-O-CF_2-CF_2-CF_3$.

9. An aqueous latex obtained by the method according to claim 1.

10. The method according to claim 1, wherein polymer (F) is a fluoropolymer essentially consisting of:
- from 65% to 80% by moles of recurring units derived from tetrafluoroethylene (TFE),
- from 20% to 35% by moles of recurring units derived from vinylidene fluoride (VDF),
- from 1.0% to 5% by moles of recurring units derived from at least one perfluoroalkylvinylether (PAVE) of formula (I):

$$CF_2=CF-O-R_f \quad (I)$$

wherein $R_f$ is a $C_1$-$C_6$ alkyl group or a $C_1$-$C_6$ (per)fluoroalkyl group, and
- from 0 to 10% by moles of recurring units derived from at least one fluorinated monomer different from tetrafluoroethylene (TFE), vinylidene fluoride (VDF), and perfluoroalkylvinylether (PAVE) of formula (I), wherein the molar amounts of said recurring units are relative to the total moles of recurring units in said polymer (F).

11. The method according to claim 1, wherein polymer (F) comprises from 1.5% to 3.5% by moles of recurring units derived from the at least one perfluoroalkylvinylether (PAVE) of formula (I), wherein the molar amounts of said recurring units are relative to the total moles of recurring units in said polymer (F).

12. An aqueous latex comprising:

(A) at least one polymer (F) comprising:
- from 60% to 85% by moles of recurring units derived from tetrafluoroethylene (TFE), and
- from 15% to 40% by moles of recurring units derived from vinylidene fluoride (VDF),
- from 1.0% to 5% by moles of recurring units derived from at least one perfluoroalkylvinylether (PAVE) of formula (I):

$$CF_2=CF-O-R_f \quad (I)$$

wherein $R_f$ is a $C_1$-$C_6$ alkyl group or a $C_1$-$C_6$ (per)fluoroalkyl group,
- optionally, from 0 to 10% by moles of recurring units derived from at least one fluorinated monomer different from tetrafluoroethylene (TFE), vinylidene fluoride (VDF), and perfluoroalkylvinylether (PAVE) of formula (I), wherein the molar amounts of said recurring units are relative to the total moles of recurring units in said polymer (F), and (B) at least one surfactant (F) of formula (II):

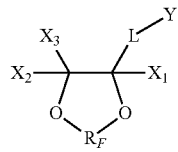

wherein $X_1$, $X_2$ and $X_3$, equal to or different from each other, are independently selected from the group consisting of H, F and $C_1$-$C_6$ (per)fluoroalkyl groups, optionally comprising one or more catenary or non-catenary oxygen atoms, L is a bond or a divalent group, $R_F$ is a divalent fluorinated $C_1$-$C_3$ bridging group;

wherein the polymer (F) in the aqueous latex is in the form of primary particles having an average primary particle size of from 55 to 300 nm, as measured according to ISO 13321.

* * * * *